United States Patent
Sakamoto et al.

(10) Patent No.: US 9,873,796 B2
(45) Date of Patent: Jan. 23, 2018

(54) GREEN PIGMENT COMPOSITION FOR COLOR FILTER, AND COLOR FILTER

(71) Applicant: DIC Corporation, Tokyo (JP)

(72) Inventors: Keisuke Sakamoto, Sakura (JP); Akira Kimura, Sakura (JP); Katsunori Shimada, Sakura (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 15/116,344

(22) PCT Filed: Sep. 30, 2014

(86) PCT No.: PCT/JP2014/076131
§ 371 (c)(1),
(2) Date: Aug. 3, 2016

(87) PCT Pub. No.: WO2015/118720
PCT Pub. Date: Aug. 13, 2015

(65) Prior Publication Data
US 2017/0009075 A1    Jan. 12, 2017

(30) Foreign Application Priority Data

Feb. 7, 2014   (JP) .................................. 2014-022266

(51) Int. Cl.
C09B 47/10   (2006.01)
G02B 5/20    (2006.01)
G02B 5/22    (2006.01)
G02F 1/1335  (2006.01)

(52) U.S. Cl.
CPC .............. *C09B 47/10* (2013.01); *G02B 5/201* (2013.01); *G02B 5/223* (2013.01); *G02F 1/133514* (2013.01)

(58) Field of Classification Search
CPC ..................................................... C09B 47/10
See application file for complete search history.

(56) References Cited

U.S. PATENT DOCUMENTS

2006/0098316 A1*  5/2006  Tatsuzawa ........ G02F 1/133516
                                              359/891

FOREIGN PATENT DOCUMENTS

| JP | 2003-176423 A | 6/2003 |
| JP | 2004-070342 A | 3/2004 |
| JP | 2004-070343 A | 3/2004 |
| JP | 2007-284589 A | 11/2007 |
| JP | 2007-320986 A | 12/2007 |
| JP | 2009-098594 A | 5/2009 |
| JP | 2012-072252 A | 4/2012 |
| JP | 2012-145604 A | 8/2012 |
| JP | 2012-247539 A | 12/2012 |
| JP | 2013-077035 A | 4/2013 |
| JP | 2013-088546 A | 5/2013 |

OTHER PUBLICATIONS

International Search Report dated Nov. 18, 2014, issued for PCT/JP2014/076131.

\* cited by examiner

*Primary Examiner* — Paul V Ward
(74) *Attorney, Agent, or Firm* — Locke Lord LLP

(57) ABSTRACT

Provided are a green pigment composition for a color filter having high brightness and wide color reproduction range in a liquid crystal display, and a color filter formed including the same. A halogenated zinc phthalocyanine containing an average of 10 to 14 halogen atoms per molecule in which an average of 8 to 12 are bromine atoms and an average of 2 to 5 are chlorine atoms is used. As a result, film thickness is less than when using Pigment Green 7 and, thus, a color filter with high brightness and wide color reproduction range can be provided.

2 Claims, 1 Drawing Sheet

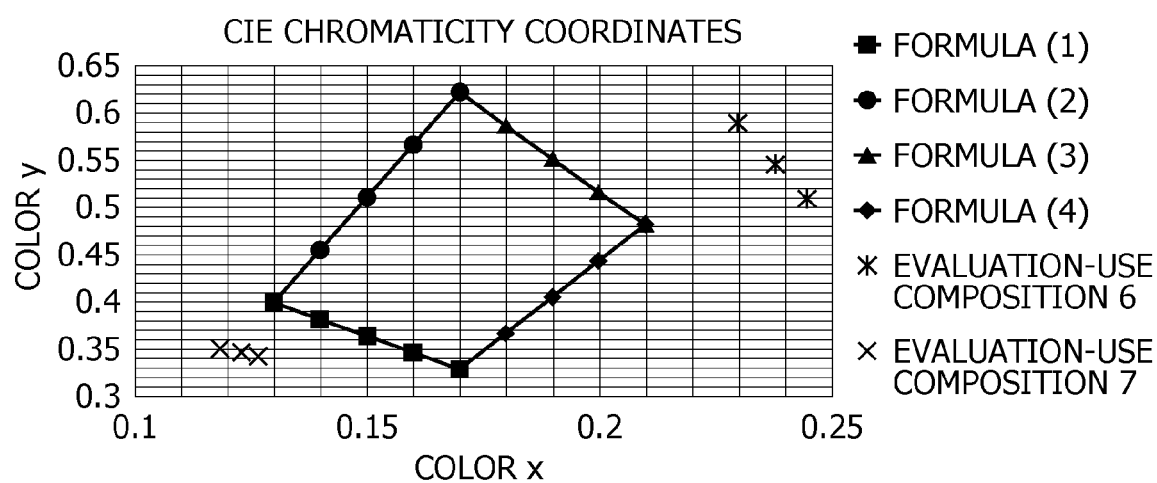

GREEN PIGMENT COMPOSITION FOR COLOR FILTER, AND COLOR FILTER

TECHNICAL FIELD

The present invention relates to a green pigment composition for a color filter, and a color filter.

BACKGROUND ART

Color filters used in liquid crystal displays are members that enable color display on a display by allowing the color filters to transmit white light from a backlight. Among these, there is a need for increased brightness and a widened color reproduction range in green coloring agents for color filters.

Selecting a pigment with high transmittance with respect to the light from the backlight is important for increasing brightness and improvements have been made using Pigment Green 58 as a main pigment instead of the conventionally used Pigment Green 36. In addition, by increasing the brightness of the pigment, the white light from the backlight can be used effectively and, as a result, energy savings and reductions in manufacturing costs of displays are possible.

Furthermore, in order to widen the color reproduction range, Pigment Green 7 with which film thickness for a specific chromaticity can be reduced as compared to Pigment Green 36 and Pigment Green 58, is selected as the main pigment. The reason why Pigment Green 7 is selected is because while it is possible to widen the color reproduction range by increasing film thickness of Pigment Green 36 or Pigment Green 58, it is not possible to attain an NTSC ratio of 90% or higher with a practical film thickness. For example, proposals have been made for forming green pixels using a green photosensitive resin composition containing Pigment Green 7 and Pigment Yellow 185, and achieving a film thickness of 2.2 μm or less and high color reproduction. However, due to the fact that the transmittance of Pigment Green 7 is low as compared to that of Pigment Green 36 and Pigment Green 58, there is a problem in that the brightness of the resulting display decreases. Furthermore, while it is possible to compensate for the brightness by increasing the light intensity of the backlight, this leads to a new problem in that the amount of power consumption increases. As such, there is a demand for improvement. Thus, there is a need for a color material for color filters by which both brightness and color reproducibility can be achieved.

To solve the problems described above, PTL 1 and PTL 2 propose the use of a color material constituted from Pigment Green 58, Pigment Blue 15:3 and/or Pigment Blue 15:6 as a blue color material, and Pigment Yellow 150 as a yellow pigment.

PTL 3 proposes that brightness can be improved through the use of a color material including Pigment Green 7 as a green pigment, Pigment Yellow 138 as a yellow pigment, and a yellow dye.

Furthermore, PTL 4 to PTL 6 propose a pigment for color filters containing a halogenated zinc phthalocyanine in which numbers of bromine atoms, chlorine atoms, and hydrogen atoms are specified, and capable of displaying certain chromatic coordinates of yellow.

However, the background art is not sufficient and currently incapable of forming a color filter aimed at increasing brightness and expanding the color reproduction range.

CITATION LIST

Patent Literature

PTL 1: Japanese Unexamined Patent Application Publication No. 2012-247539
PTL 2: Japanese Unexamined Patent Application Publication No. 2012-072252
PTL 3: Japanese Unexamined Patent Application Publication No. 2013-088546
PTL 4: Japanese Unexamined Patent Application Publication No. 2004-070342
PTL 5: Japanese Unexamined Patent Application Publication No. 2004-070343
PTL 6: Japanese Unexamined Patent Application Publication No. 2007-284589

SUMMARY OF INVENTION

Technical Problem

The present invention aims to provide a green pigment composition for a color filter having high brightness and wide color reproduction range, and a color filter formed from the same.

Solution to Problem

A pigment composition for a color filter according to the present invention provides a pigment composition for a color filter including a halogenated zinc phthalocyanine containing an average of 10 to 14 halogen atoms per molecule, in which an average of 8 to 12 are bromine atoms and an average of 2 to 5 are chlorine atoms.

In addition, with the pigment composition for a color filter according to the present invention, when a coating film including the halogenated zinc phthalocyanine pigment described above and a resin is formed with a film thickness of 1.5 μm to 2.4 μm, a pigment composition for a color filter is provided which is capable of displaying, in CIE XYZ color space colormetered using a C illuminant alone, an xy chromaticity coordinate region bounded by formulae (1) to (4) below.

$$y=-1.766x+0.628 \quad \text{Formula (1)}$$

(where x is such that $0.13<x<0.17$)

$$y=5.573x-0.326 \quad \text{Formula (2)}$$

(where x is such that $0.13<x<0.17$)

$$y=-3.498x+1.216 \quad \text{Formula (3)}$$

(where x is such that $0.17<x<0.21$)

$$y=3.840x-0.325 \quad \text{Formula (4)}$$

(where x is such that $0.17<x<0.21$)

In addition, a color filter containing the pigment composition for a color filter described above is provided.

Advantageous Effects of Invention

In the present invention, a halogenated zinc phthalocyanine containing an average of 10 to 14 halogen atoms per molecule in which an average of 8 to 12 are bromine atoms and an average of 2 to 5 are chlorine atoms is used. As a result, film thickness is less than when using Pigment Green 7 and, thus, a color filter with high brightness and wide color reproduction range can be provided.

BRIEF DESCRIPTION OF DRAWINGS

FIG. 1 is a graph illustrating a region in the C illuminant where the pigment composition of the present invention is monochromatically reproducible.

DESCRIPTION OF EMBODIMENTS

With the coating film formed from the halogenated zinc phthalocyanine pigment composition according to the present invention and a resin, it was discovered that a color filter can be fabricated that has high brightness and low film thickness, that is, high tinting strength, and that is capable of displaying a specific xy chromaticity coordinate region in XYZ color space.

In the present invention, "halogenated zinc phthalocyanine pigment" refers to a halogenated zinc phthalocyanine for which an average primary particle size is from 0.01 to 0.30 μm.

Note that in the present invention, the average primary particle size is measured as follows. First, particles within a field of view are photographed using a JEM-2010 transmission electron microscope (manufactured by JEOL, Ltd.). Then, in a two-dimensional image, the maximum length (major axis) of the diameter of each of 50 primary particles constituting an aggregate of the halogenated zinc phthalocyanine primary particles is determined, and the average thereof is regarded as the average primary particle size. Here, the sample, namely the halogenated zinc phthalocyanine, is photographed by the microscope after being subjected to ultrasonic dispersion in a solvent. A scanning electron microscope may be used in place of the transmission electron microscope.

The halogenated zinc phthalocyanine pigment composition of the present invention contains a halogenated zinc phthalocyanine pigment of a specific halogen atom composition including plural types of halogen atoms at a specific ratio. More specifically, the halogenated zinc phthalocyanine contains an average of 10 to 14 halogen atoms per molecule, an average of 8 to 12 being bromine atoms and an average of 2 to 5 being chlorine atoms. More preferably, to realize high color reproduction, the halogenated zinc phthalocyanine contains an average of 11 to 13 halogen atoms per molecule, an average of 8 to 11 being bromine atoms and an average of 2 to 3 being chlorine atoms.

Furthermore, when a film thickness of a coating film, formed from the halogenated zinc phthalocyanine pigment described above and the resin, is from 1.5 μm to 2.4 μm, the green pigment composition for a color filter can display an xy chromaticity coordinate region in CIE XYZ color space, colormetered alone using a C illuminant, bounded by formulae (1) to (4) below:

$$y = -1.766x + 0.628 \quad \text{Formula (1)}$$

(where x is such that $0.13 < x < 0.17$)

$$y = 5.573x - 0.326 \quad \text{Formula (2)}$$

(where x is such that $0.13 < x < 0.17$)

$$y = -3.498x + 1.216 \quad \text{Formula (3)}$$

(where x is such that $0.17 < x < 0.21$)

$$y = 3.840x - 0.325 \quad \text{Formula (4)}$$

(where x is such that $0.17 < x < 0.21$)

The green pigment composition for a color filter that can display an xy chromaticity coordinate region bounded by formulae (5) to (8) below is even more preferable:

$$y = -1.766x + 0.628 \quad \text{Formula (5)}$$

(where x is such that $0.13 < x < 0.17$)

$$y = 4.598x - 0.199 \quad \text{Formula (6)}$$

(where x is such that $0.13 < x < 0.17$)

$$y = -3.498x + 1.177 \quad \text{Formula (7)}$$

(where x is such that $0.17 < x < 0.21$)

$$y = 2.865x - 0.159 \quad \text{Formula (8)}$$

(where x is such that $0.17 < x < 0.21$)

The average composition of the halogenated zinc phthalocyanine pigment composition can be determined from an X-ray fluorescence analysis.

The halogenated zinc phthalocyanine pigment composition of the present invention has specificity to blue hues, instead of yellow hues as with conventional green pigments containing high numbers of halogens. By including the pigment composition of the present invention in the color filter, it is possible to express hues formerly impossible with conventional high-halogenated zinc phthalocyanine pigments and brightness will be high. Furthermore, it is possible to reduce the film thickness when formed into a color filter because tinting strength is high. On the other hand, halogenated zinc phthalocyanine pigment compositions that are more blue than the halogenated zinc phthalocyanine pigment composition of the present invention are not suitable as pigment compositions for color filters because green pixels cannot be formed by mixing such composition with a yellow pigment composition. In addition, while proposals have been made for achieving a film thickness of 2.2 μm or less and high color reproduction using a green photosensitive resin composition containing Pigment Green 7, which has a blue hue, and Pigment Yellow 185 to form a green pixel, transmittance thereof is low compared to Pigment Green 36 and Pigment Green 58, and there is a problem in that the brightness of the resulting display decreases. While it is possible to compensate for the brightness by increasing the light intensity of the backlight, this leads to a new problem in that the amount of power consumption increases. As such, there is a demand for improvement.

The halogenated zinc phthalocyanine pigment composition used in the present invention can be manufactured from halogenated zinc phthalocyanine. This halogenated zinc phthalocyanine can be manufactured through known manufacturing methods such as, for example, chlorosulfonic acid methods, halogenated phthalonitrile methods, melting methods, and the like.

Examples of the chlorosulfonic acid methods include a method consisting of dissolving zinc phthalocyanine in a sulfur-oxide based solvent such as chlorosulfonic acid or the like, and halogenating by adding chlorine gas and bromine thereto. Here, the reaction is carried out at a temperature of 20 to 120° C. for 3 to 20 hours.

Examples of the halogenated phthalonitrile methods include a method consisting of using phthalic acid or a phthalodinitrile in which a part or all of the hydrogen atoms of the aromatic ring are substituted by bromine, chlorine, or similar halogen atoms, and a zinc metal or metal salt as an appropriate starting material, in order to synthesize a corresponding halogenated zinc phthalocyanine. In this case, a catalyst such as ammonium molybdate or the like may be used as necessary. Here, the reaction is carried out at a temperature of 100 to 300° C. for 7 to 35 hours.

Examples of the melting methods include a method consisting of halogenating zinc phthalocyanine using a halogenating agent in a melt of approximately 10 to 170° C.

formed from one type or a mixture of two or more types of compounds, which function as solvents when carrying out various types of halogenation, such as aluminum chloride, aluminum bromide, and similar aluminum halides; titanium tetrachloride and similar titanium halides; sodium chloride, sodium bromide, and similar alkali metal halides or alkali earth metal halides (hereinafter referred to as "alkali (earth) metal halides"); thionyl chloride; and the like.

Aluminum chloride is preferable as the aluminum halide. In the method described above where aluminum halide is used, an amount of the aluminum halide added is typically at least 3-fold moles, and is preferably from 10 to 20-fold moles with respect to the zinc phthalocyanine.

The aluminum halide may be used alone, but it is preferable from a workability perspective that the aluminum halide is used in conjunction with the alkali (earth) metal halide because the melting temperature can be further lowered. Sodium chloride is preferable as the alkali (earth) metal halide. An amount of the alkali (earth) metal halide added is within a range where a molten salt is produced and is preferably from 5 to 15 parts by mass per 10 parts by mass of the aluminum halide.

Examples of the halogenating agent include chlorine gas, sulfuryl chloride, bromine, and the like.

A temperature of the halogenation is preferably from 10 to 170° C. and is more preferably from 30 to 140° C. Furthermore, it is also possible to pressurize in order to accelerate the reaction rate. Reaction time is from 5 to 100 hours and preferably from 30 to 45 hours.

Melting methods where two or more types of the compounds recited above are used are preferable because the content ratio of the halogenated zinc phthalocyanine having the specific halogen atom composition in the produced halogenated zinc phthalocyanine can be controlled as desired by adjusting the ratio of the chlorides, bromides, and iodides in the molten salt, changing the amounts of chlorine gas, bromine, or iodine introduced, changing the reaction time, and the like.

In the present invention, zinc phthalocyanine is preferable as the metal phthalocyanine raw material. From the perspective of obtaining the halogenated zinc phthalocyanine, a melting method is preferable because the yield from the raw material will be higher due to the dissolution of the raw material during the reaction being low, and the reaction can be carried out in a low-cost apparatus due to strong acid not being used.

In the present invention, a halogenated zinc phthalocyanine having a halogen atom composition differing from those of existing halogenated zinc phthalocyanines can be obtained by optimizing the raw material feed method, the type and amount of catalyst used, the reaction temperature, and the reaction time.

Regardless of which of the manufacturing methods described above is used, following completion of the reaction, the produced halogenated zinc phthalocyanine precipitates upon submersion of the obtained mixture in water, hydrochloric acid, or a similar acidic aqueous solution. The precipitate may be used as-is as the halogenated zinc phthalocyanine, but is preferably used after being subjected to post-treatment such as filtering; and washing using water or aqueous sodium bisulfate, aqueous sodium bicarbonate, or sodium hydroxide; and, as necessary, washing using an organic solvent such as acetone, toluene, methyl alcohol, ethyl alcohol, dimethylformamide, or the like; drying; and the like.

As necessary, the halogenated zinc phthalocyanine may be made into a pigment by dry grinding the halogenated zinc phthalocyanine in a grinder such as an attritor, ball mill, vibration mill, vibratory ball mill, or the like, and then subjecting the resulting product to a solvent salt milling method or solvent boiling method. Thereby, compared to the product before the pigmentation, the obtained pigment has superior dispersibility and tinting strength, and forms a green color with high brightness.

The method of making the halogenated zinc phthalocyanine into a pigment is not particularly limited. For example, the halogenated zinc phthalocyanine before the pigmentation may simultaneously be dispersed in a dispersion medium and made into a pigment. However, from the perspectives that crystal growth can be easily suppressed and pigment particles of a larger specific surface area can be obtained, solvent salt milling treatment is preferably selected over solvent treatment where the halogenated metal phthalocyanine is heated and stirred in a large amount of organic solvent.

Here, "solvent salt milling" means mixing/grinding the crude pigment, namely the halogenated zinc phthalocyanine, immediately after synthesis or after the grinding but before the pigmentation, together with a mineral salt, and an organic solvent. In this case, the latter crude pigment is preferably used. Specifically, the crude pigment, the mineral salt, and the organic solvent, which does not dissolve the mineral salt are placed in a mixer and mixing/grinding is carried out therein. Examples of the mixer used here include kneaders, mix mullers, and the like.

Water-soluble mineral salts can be advantageously used as the mineral salt described above and preferable examples thereof include sodium chloride, potassium chloride, sodium sulfate, and similar mineral salts. More preferably, a mineral salt having an average particle size of 0.5 to 50 μm is used. Such a mineral salt can be easily obtained by pulverizing a regular mineral salt.

In the present invention, a halogenated metal phthalocyanine pigment composition having an average primary particle size of 0.01 to 0.10 μm is preferably used in a color filter application. In the obtaining of the preferable halogenated zinc phthalocyanine described above in the present invention, it is preferable to increase the amount of the mineral salt used with respect to the amount of crude pigment used in the solvent salt milling. Specifically, the amount of the mineral salt used is preferably from 5 to 20 parts by mass and more preferably from 7 to 15 parts by mass per 1 part by mass of the crude pigment.

An organic solvent by which crystal growth can be suppressed is preferably used as the organic solvent; and a water-soluble organic solvent can be advantageously used as such an organic solvent. Examples of the water-soluble organic solvents that can be used include diethylene glycol, glycerin, ethylene glycol, propylene glycol, liquid polyethylene glycol, liquid polypropylene glycol, 2-(methoxymethoxy) ethanol, 2-butoxyethanol, 2-(isopentyloxy) ethanol, 2-(hexyloxy) ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and the like. The amount of the water-soluble organic solvent used is not particularly limited, but is preferably from 0.01 to 5 parts by mass per 1 part by mass of the crude pigment.

In the method for manufacturing the halogenated zinc phthalocyanine pigment composition of the present invention, the crude pigment alone may be subjected to the solvent salt milling, or the crude pigment may be subjected to solvent salt milling in conjunction with the halogenated zinc phthalocyanine and a phthalocyanine derivative. The phthalocyanine derivative may be added when synthesizing the crude pigment or after the pigmentation, but more preferably is added before the solvent salt milling or similar pigmentation step. By adding the phthalocyanine derivative, an increase in viscosity characteristics and an increase in dispersion stability of a resist ink for a color filter can be achieved.

While any known customary product can be used, a phthalocyanine pigment derivative represented by General Formula (1) or (2) below is preferable as the phthalocyanine derivative. Note that, while halogenated zinc phthalocyanine or a phthalocyanine derivative corresponding to the raw material thereof, namely zinc phthalocyanine, is preferable as the phthalocyanine derivative, a halogenated copper phthalocyanine derivative or a copper phthalocyanine derivative can also be used as such only constitute a small amount even when used in conjunction.

$$P-(Y)n \qquad \text{General Formula (1)}$$

$$P-(A-Z)n \qquad \text{General Formula (2)}$$

(where P is a residue after removing n number of hydrogen of an unsubstituted or halogenated phthalocyanine ring either having or not having a central metal; Y is a primary to tertiary amino group, a carboxylic acid group, a sulfonic acid group, or a salt with a base or metal thereof; A is a divalent linking group; Z is a residue after removing at least one hydrogen on the nitrogen atom of a primary to secondary amino group, or a residue after removing at least one hydrogen on the nitrogen atom of a heterocyclic ring containing nitrogen; m is a number from 1 to 4; and n is a number from 1 to 4.)

Examples of the central metal include Zn, and examples of the primary to secondary amino group include monomethylamino groups, dimethylamino groups, diethylamino groups, and the like. Examples of the base or metal forming the salt with the carboxylic acid group or sulfonic acid group include ammonia; dimethylamine, diethylamine, triethylamine, and similar organic bases; and potassium, sodium, calcium, strontium, aluminum, and similar metals. Examples of the divalent linking group of A include alkylene groups having 1 to 3 carbon atoms, —CO2-, —SO2-, —So2NH(CH2)m-, and similar divalent linking groups. Examples of Z include phthalimido groups, monoalkylamino groups, dialkylamino groups, and the like.

The phthalocyanine derivative that can be included in the crude pigment when preparing the crude pigment and/or when performing the solvent salt milling is typically from 0.01 to 0.3 parts by mass per 1 part by mass of the crude pigment. Note that in cases where using the phthalocyanine derivative when preparing the crude pigment and/or when performing the solvent salt milling, a total amount of the crude pigment and the phthalocyanine derivative is regarded as the amount of the crude pigment used, and the amount of the mineral salt used and the like is selected from the previously recited range.

A temperature when performing the solvent salt milling is preferably from 30 to 150° C. and is more preferably from 80 to 100° C. A time of performing the solvent salt milling is preferably from 5 to 20 hours and is more preferably from 8 to 18 hours.

A mixture containing the halogenated zinc phthalocyanine pigment composition having an average primary particle size of 0.01 to 0.10 μm, the mineral salt, and the organic solvent as main components can be obtained as described above; and, by removing the organic solvent and mineral salt from this mixture and, as necessary, subjecting the resulting solid having the halogenated zinc phthalocyanine pigment composition as the main constituent to washing, filtering, drying, crushing, and other treatment, a powder of the halogenated zinc phthalocyanine pigment composition can be obtained.

The washing can be performed using either cold water or hot water. A number of times of the washing is in a range of 1 to 5 and can be repeated. In a case where the mixture contains both the water-soluble mineral salt and the water-soluble organic solvent, the mineral salt and the organic solvent can easily be removed by washing with water. If necessary, acid washing, alkaline washing, or organic solvent washing may be performed so as not to alter the crystalline state.

Examples of the drying after the filtering off and washing described above include batch or continuous drying or the like in which the pigment is dewatered and/or desolventized by heating or the like at a temperature of 80 to 120° C. by a heating source provided in a dryer; and examples of the dryer include typical box-type dryers, band dryers, spray dryers, and the like. Particularly, spray drying is preferable because the pigment dried by spray dryers is readily dispersible when producing a paste. The crushing after the drying is not an operation for enlarging the specific surface area or reducing the average primary particle size, but rather to break up and powderize the pigment in cases where the pigment is in the form of a lump or the like such as when drying using a band dryer; and examples include crushing using a mortar, a hammer mill, a disk mill, a pin mill, a jet mill, or the like. Thus, a dry powder including the halogenated zinc phthalocyanine pigment composition of the present invention as the main constituent can be obtained.

Note that the aggregation of the primary particles of the halogenated zinc phthalocyanine pigment composition of the present invention is weaker than in conventional halogenated copper phthalocyanine pigments, and breaks down more easily. Thus, using electron microscope photography, observation of each of the primary particles of the pigment constituting an aggregate, which is not possible with conventional pigments, is possible.

The halogenated zinc phthalocyanine pigment composition of the present invention can be used in any known customary application but, particularly, because the average primary particle size is from 0.01 to 0.10 μm, pigment aggregation is also comparatively weak and dispersion in a synthetic resin or the like to be colored is better.

The halogenated zinc phthalocyanine pigment composition of the present invention is preferably used in a green pixel portion of a color filter because pigment dispersion in a photosensitive composition for color filters is easy, light curing sensitivity at 365 nm, used frequently when curing photosensitive compositions for color filters, does not decrease, and film loss and pattern flow does not easily occur when developing. Thus, a green pixel portion of a color filter having both high brightness and color reproduction that has been demanded in recent years can be more conveniently obtained.

If a vertical-to-horizontal aspect ratio of the primary particles of the halogenated zinc phthalocyanine pigment composition of the present invention is from 1 to 3, viscosity characteristics in each field of application will improve and fluidity will increase. To determine the aspect ratio, first, as when determining the average primary particle size, particles within the field of view are photographed using a transmission electron microscope or a scanning electron microscope. Then, in a two-dimensional image, the maximum length (major axis) and the minimum length (minor axis) of the diameter of each of 50 primary particles constituting an aggregate are measured to obtain average values thereof, and the aspect ratio is calculated using these values.

The color filter of the present invention can be obtained by including the halogenated zinc phthalocyanine pigment composition of the present invention in at least the green pixel portion of the color filter.

As with conventional halogenated zinc phthalocyanine pigments, when obtaining the green pixel portion of the color filter, the halogenated zinc phthalocyanine pigment composition of the present invention can suppress decreases in optical transmittance in the entire range from 380 to 780 nm to a minimum, without using a yellow pigment in conjunction to specially tone or, even if a yellow pigment is also used, only a small amount is needed.

As described above, as with conventional halogenated zinc phthalocyanine pigments, with the halogenated zinc phthalocyanine pigment composition of the present invention, the wavelength (Tmax) where the transmittance in the spectral transmission spectrum in the 380 to 780 nm range reaches a maximum is 500 to 520 nm, and a half-width of a transmission curve thereof is extremely sharp at 110 nm. (This wavelength is not affected by the hereinafter described photosensitive resin.)

In the present invention, "spectral transmission spectrum" is determined by using a type 1 spectrophotometer specified by Japanese Industrial Standards JIS Z 8722 (Methods of colour measurement-Reflecting and transmitting objects). A resin film including the pigment composition is formed on a glass substrate or the like at the predetermined dry film thickness described above and is scan-radiated with light of a predetermined wavelength range to plot transmittance values of respective wavelengths. The transmittance as a color filter can be more accurately determined by, for example, performing correction (baseline correction or the like) at the spectral transmission spectrum determined likewise for a film of the same dry film thickness constituted only by the resin.

When using a white light, F10, or similar light source, the color filter containing the halogenated zinc phthalocyanine pigment composition of the present invention in the green pixel portion thereof can effectively transmit the green luminescent lines of the light source and, due to the fact that the spectral transmission spectrum of the halogenated zinc phthalocyanine pigment composition is sharp, green color purity and tinting strength can be expressed to the fullest.

The halogenated zinc phthalocyanine pigment composition of the present invention can be used alone, as-is in the manufacturing of the green pigment portion of the color filter or, if necessary, may be used in combination with a known customary green halogenated copper phthalocyanine or other green halogenated metal phthalocyanine pigment such as a green halogenated dissimilar metal phthalocyanine pigment.

The halogenated zinc phthalocyanine pigment composition of the present invention and the known customary green halogenated metal phthalocyanine pigment are used at a mass ratio of 100:0 to 80:20 and preferably 100:0 to 90:10.

In addition to the green pigments, a yellow pigment may be used for toning in order to express characteristics. Examples of yellow pigments that can be used include C.I. Pigment Yellows 83, 110, 129, 138, 139, 150, 180, 185, and similar yellow organic pigments. A combination ratio of the yellow pigment to the halogenated zinc phthalocyanine pigment composition of the present invention is 10 to 200 parts by mass of the yellow pigment per 100 parts by mass of the halogenated zinc phthalocyanine pigment composition.

If the halogenated zinc phthalocyanine pigment composition of the present invention is used, even when the yellow pigment is used for toning, compared to conventional cases where two or more pigments of different colors were blended for the toning, a green pixel portion for a color filter that is bright and has low turbidity and superior color purity and tinting strength can be obtained.

For example, compared to a case where a blended pigment is used that includes a conventional green pigment such as C.I. Pigment Green 7 or 36 and the yellow pigment described above, using the halogenated zinc phthalocyanine pigment composition of the present invention in conjunction with the yellow pigment results in higher color purity and tinting strength and, therefore, there will be less of a decrease in brightness and the quantity of light transmitted in the green area will be greater.

The halogenated zinc phthalocyanine pigment composition of the present invention can be used in the formation of a pattern of the green pixel portion of the color filter by known methods. Typically, a photosensitive composition for the green pixel portion of the color filter including the halogenated zinc phthalocyanine pigment composition of the present invention and a photosensitive resin as essential constituents can be obtained.

Examples of the method for manufacturing the color filter include so-called photolithography methods in which a green pattern is obtained by: dispersing the halogenated zinc phthalocyanine pigment composition in a dispersion medium formed from the photosensitive resin; then, applying the mixture on a glass or similar transparent substrate by using a spin coating method, a roll coating method, a slit coating method, an ink jet method, or the like; then, subjecting the applied film to ultraviolet light pattern exposure via a photomask; and, then, washing the unexposed portions with a solvent or the like.

Additionally, the color filter may be manufactured by forming the pattern of the green pixel portion using an electrodeposition method, a transfer method, an electrolytic micelle disruption method, or a PVED (Photovoltaic Electrodeposition) method. Note that a pattern of a red pixel portion and a pattern of a blue pixel portion can be formed using known pigments via the same methods.

When preparing the photosensitive composition for the green pixel portion of the color filter, for example, the halogenated zinc phthalocyanine pigment composition of the present invention, the photosensitive resin, a photopolymerization initiator, and an organic solvent for dissolving the resin are blended as essential constituents. A typical manufacturing method thereof is a preparation method in which a dispersion liquid is first prepared using a halogenated zinc phthalocyanine pigment composition, an organic solvent, and, as necessary, a dispersant, and then the photosensitive resin or the like is added thereto.

Here, the halogenated zinc phthalocyanine pigment composition that may or may not contain the phthalocyanine derivative described above and, as necessary, the yellow pigment can be used as the halogenated zinc phthalocyanine pigment composition.

Examples of the dispersant used as necessary include DISPERBYK® 130, 161, 162, 163, 170, LPN-6919, and LPN-21116 (manufactured by BYK Chemie), Efka 46 and Efka 47 (manufactured by Efka), and the like. Additionally, leveling agents, coupling agents, cationic surfactants, and the like may also be used.

Examples of the organic solvent include toluene, xylene, methoxybenzene, and similar aromatic solvents; ethyl acetate, butyl acetate, propylene glycol monomethyl ether acetate, propylene glycol monoethyl ether acetate, and similar acetic acid ester-based solvents; ethoxyethyl propionate and similar propionate-based solvents; methanol, ethanol, and similar alcohol-based solvents; butyl cellosolve, propylene glycol monomethyl ether, diethylene glycol ethyl ether, diethylene glycol dimethyl ether, and similar ether-based solvents; methyl ethyl ketone, methyl isobutyl ketone, cyclohexanone, and similar ketone-based solvents; hexane and similar aliphatic hydrocarbon-based solvents; N,N-dimethylformamide, γ-butyrolactam, N-methyl-2-pyrrolidone, aniline, pyridine, and similar nitrogen compound-based solvents; γ-butyrolactone and similar lactone-based solvents; carbamic acid esters such as 48:52 mixtures of methyl carbamate and ethyl carbamate; water; and the like. Polar solvents that are water soluble, particularly propionate-based, alcohol-based, ether-based, ketone-based, nitrogen compound-based, and lactone-based solvents, water, and the like are suitable as the organic solvent.

The dispersion liquid can be obtained by uniformly stirring and dispersing, per 100 parts by mass of the halogenated zinc phthalocyanine pigment composition of the present invention, 300 to 1000 parts by mass of the organic solvent and, as necessary, 0 to 100 parts by mass of the dispersant and/or 0 to 20 parts by mass of the phthalocyanine derivative. Next, the photosensitive composition for the green pixel portion of the color filter can be obtained by adding 3 to 20 parts by mass of the photosensitive resin per 1 part by mass of the halogenated zinc phthalocyanine pigment composition, 0.05 to 3 parts by mass of the photopolymerization initiator per 1 part by mass of the photosensitive resin, and, as necessary, also the organic solvent to the dispersion liquid, and stirring and dispersing uniformly.

Examples of the photosensitive resin that can be used here include urethane resins, acrylic resins, polyamic acid resins, polyimide resins, styrene-maleic resins, styrene-maleic anhydride resins, and similar thermoplastic resins; and photopolymerizable monomers such as 1,6-hexanediol diacrylate, ethylene glycol diacrylate, neopentyl glycol diacrylate, triethylene glycol diacrylate, bis(acryloxyethoxy)bisphenol A, 3-methylpentanediol diacrylate, and similar bifunctional monomers; and trimethylolpropatone triacrylate, pentaerythritol triacrylate, tris(2-hydroxyethyl)isocyanate, dipentaerythritol hexaacrylate, dipentaerythritol pentaacrylate, and similar polyfunctional monomers.

Examples of the photopolymerization initiator include acetophenone, benzophenone, benzyl dimethyl ketanol, benzoyl peroxide, 2-chlorothioxantone, 1,3-bis(4'-azidobenzal)-2-propane, 1,3-bis(4'-azidobenzal)-2-propane-2'-sulfonic acid, and 4,4'-diazidostilbene-2,2'-disulfonic acid.

The photosensitive composition for the green pixel portion of the color filter prepared as described above is subjected to ultraviolet light pattern exposure via a photomask. Subsequently, unexposed portions are cleaned with an organic solvent, alkaline water, or the like. Thus, the color filter can be prepared.

The halogenated zinc phthalocyanine pigment composition of the present invention has a bluish green color with high tinting strength, and forms a bright green color with high color purity and high contrast. Accordingly, in addition to use in the color filter described in detail above, the halogenated zinc phthalocyanine pigment composition of the present invention is also suited for coloring of coatings, plastics, printing ink, rubber, leather, printing, electronic toner, jet ink, thermal transfer printing ink, and the like.

EXAMPLES

Next, a specific description of the present invention using examples will be given. Hereinafter, when no other mention is made, percentages (%) and parts are based on mass.

Manufacturing Example 1

Zinc phthalocyanine was manufactured using phthalonitrile, ammonia, and zinc chloride as raw materials. This 1-chloronaphthalene solution had light absorption in the 750 to 850 nm range.

Example 1

91 parts of sulfuryl chloride, 109 parts of aluminum chloride, 15 parts of sodium chloride, 30 parts of zinc phthalocyanine, and 74 parts of bromine were charged into a 300 mL flask. The temperature was raised to 130° C. over the course of 40 hours and the resulting mixture was taken out from the flask and put in water. Then, the mixture was filtered. Thus, a green crude pigment was obtained. 20 parts of the obtained green crude pigment, 140 parts of powdered sodium chloride, 32 parts of diethylene glycol, and 1.8 parts of xylene were charged into a 1 L double-arm kneader and kneaded for six hours at 100° C. The resulting product was placed in 2 kg of 80° C. water after the kneading and the mixture was stirred for one hour. Thereafter, the mixture was filtered, washed with hot water, dried, and crushed. Thus, a green pigment was obtained. The obtained green pigment was subjected to X-ray fluorescence analysis using a ZSX100E (manufactured by Rigaku Corporation). From this analysis it was found that the obtained green pigment was a halogenated zinc phthalocyanine having an average of 13.97 halogen atoms per molecule, an average of 11.46 being bromine atoms and an average of 2.51 being chlorine atoms.

2.48 parts of the obtained green pigment, 1.24 parts of BYK-LPN6919 (manufactured by BYK Chemie), 1.86 parts of UNIDIC ZL-295 (manufactured by DIC Corporation), and 10.92 parts of propylene glycol monomethyl ether acetate were dispersed for two hours in a paint conditioner (manufactured by Toyo Seiki Seisaku-Sho, Ltd.) along with and using 0.3 to 0.4 mm zircon beads. Thus, a coloring composition 1 was obtained. 4.0 parts of the coloring composition 1, 0.98 parts of the UNIDIC ZL-295, and 0.22 parts of the propylene glycol monomethyl ether acetate were added and blended in the paint conditioner. Thus, an evaluation-use composition 1 for forming a green pixel portion of a color filter was obtained. This evaluation-use composition 1 was spin coated on soda glass while varying film thickness, and dried at 90° C. for three minutes. Thus, an evaluation-use glass substrate was obtained. This glass substrate was heated at 230° C. for one hour and, thereafter, chromaticity (x, y) in the C illuminant were measured using a CM-3500d (manufactured by Konica Minolta, Inc.), and the film thickness was measured using an OPTELICS C130 real color confocal microscope (manufactured by Lasertec Corporation).

The evaluation results are as shown below.
Film thickness: 1.5 μm, Color x: 0.200, Color y: 0.466
Film thickness: 1.9 μm, Color x: 0.191, Color y: 0.497
Film thickness: 2.4 μm, Color x: 0.180, Color y: 0.536

Example 2

91 parts of sulfuryl chloride, 109 parts of aluminum chloride, 15 parts of sodium chloride, 30 parts of zinc phthalocyanine, and 59 parts of bromine were charged into a 300 mL flask. The temperature was raised to 130° C. over the course of 40 hours and the resulting mixture was taken out from the flask and put in water. Then, the mixture was filtered. Thus, a green crude pigment was obtained. 20 parts of the obtained green crude pigment, 140 parts of powdered sodium chloride, 32 parts of diethylene glycol, and 1.8 parts of xylene were charged into the 1 L double-arm kneader and kneaded for six hours at 100° C. The resulting product was placed in 2 kg of 80° C. water after the kneading and the mixture was stirred for one hour. Thereafter, the mixture was filtered, washed with hot water, dried, and crushed. Thus, a green pigment was obtained. The obtained green pigment was subjected to X-ray fluorescence analysis. From this analysis, it was found that the obtained green pigment was a halogenated zinc phthalocyanine having an average of 12.71 halogen atoms per molecule, an average of 10.22 being bromine atoms and an average of 2.49 being chlorine atoms.

2.48 parts of the obtained green pigment, 1.24 parts of BYK-LPN6919, 1.86 parts of UNIDIC ZL-295, and 10.92 parts of propylene glycol monomethyl ether acetate were dispersed for two hours in the paint conditioner along with and using 0.3 to 0.4 mm zircon beads. Thus, a coloring composition 2 was obtained. 4.0 parts of the coloring composition 2, 0.98 parts of the UNIDIC ZL-295, and 0.22 parts of the propylene glycol monomethyl ether acetate were added and blended in the paint conditioner. Thus, an evaluation-use composition 2 for forming a green pixel portion of a color filter was obtained. This evaluation-use composition 2 was spin coated on soda glass while varying film thickness, and dried at 90° C. for three minutes. Thus, an evaluation-use glass substrate was obtained. This glass substrate was heated at 230° C. for one hour and, thereafter, chromaticity (x, y) in the C illuminant were measured and the film thickness was measured.

The evaluation results are as shown below.
Film thickness: 1.5 μm, Color x: 0.182, Color y: 0.436
Film thickness: 1.9 μm, Color x: 0.171, Color y: 0.462
Film thickness: 2.4 μm, Color x: 0.158, Color y: 0.494

Example 3

91 parts of sulfuryl chloride, 109 parts of aluminum chloride, 15 parts of sodium chloride, 30 parts of zinc phthalocyanine, and 44 parts of bromine were charged into a 300 mL flask. The temperature was raised to 130° C. over the course of 40 hours and the resulting mixture was taken out from the flask and put in water. Then, the mixture was filtered. Thus, a green crude pigment was obtained. 20 parts of the obtained green crude pigment, 140 parts of powdered sodium chloride, 32 parts of diethylene glycol, and 1.8 parts of xylene were charged into the 1 L double-arm kneader and kneaded for six hours at 100° C. The resulting product was placed in 2 kg of 80° C. water after the kneading and the mixture was stirred for one hour. Thereafter, the mixture was filtered, washed with hot water, dried, and crushed. Thus, a green pigment was obtained. The obtained green pigment was subjected to X-ray fluorescence analysis. From this analysis, it was found that the obtained green pigment was a halogenated zinc phthalocyanine having an average of 11.98 halogen atoms per molecule, an average of 9.00 being bromine atoms and an average of 2.98 being chlorine atoms.

2.48 parts of the obtained green pigment, 1.24 parts of BYK-LPN6919, 1.86 parts of UNIDIC ZL-295, and 10.92 parts of propylene glycol monomethyl ether acetate were dispersed for two hours in the paint conditioner along with and using 0.3 to 0.4 mm zircon beads. Thus, a coloring composition 3 was obtained. 4.0 parts of the coloring composition 3, 0.98 parts of the UNIDIC ZL-295, and 0.22 parts of the propylene glycol monomethyl ether acetate were added and blended in the paint conditioner. Thus, an evaluation-use composition 3 for forming a green pixel portion of a color filter was obtained. This evaluation-use composition 3 was spin coated on soda glass while varying film thickness, and dried at 90° C. for three minutes. Thus, an evaluation-use glass substrate was obtained. This glass substrate was heated at 230° C. for one hour and, thereafter, chromaticity (x, y) in the C illuminant were measured and the film thickness was measured.

The evaluation results are as shown below.
Film thickness: 1.5 μm, Color x: 0.163, Color y: 0.391
Film thickness: 1.9 μm, Color x: 0.154, Color y: 0.407
Film thickness: 2.4 μm, Color x: 0.142, Color y: 0.428

Example 4

109 parts of sulfuryl chloride, 131 parts of aluminum chloride, 18 parts of sodium chloride, 30 parts of zinc phthalocyanine, and 52 parts of bromine were charged into a 300 mL flask. The temperature was raised to 130° C. over the course of 40 hours and the resulting mixture was taken out from the flask and put in water. Then, the mixture was filtered. Thus, a green crude pigment was obtained. 20 parts of the obtained green crude pigment, 140 parts of powdered sodium chloride, 32 parts of diethylene glycol, and 1.8 parts of xylene were charged into the 1 L double-arm kneader and kneaded for six hours at 100° C. The resulting product was placed in 2 kg of 80° C. water after the kneading and the mixture was stirred for one hour. Thereafter, the mixture was filtered, washed with hot water, dried, and crushed. Thus, a green pigment was obtained. The obtained green pigment was subjected to X-ray fluorescence analysis. From this analysis, it was found that the obtained green pigment was a halogenated zinc phthalocyanine having an average of 12.69 halogen atoms per molecule, an average of 8.54 being bromine atoms and an average of 4.16 being chlorine atoms.

2.48 parts of the obtained green pigment, 1.24 parts of BYK-LPN6919, 1.86 parts of UNIDIC ZL-295, and 10.92 parts of propylene glycol monomethyl ether acetate were dispersed for two hours in the paint conditioner along with and using 0.3 to 0.4 mm zircon beads. Thus, a coloring composition 4 was obtained. 4.0 parts of the coloring composition 4, 0.98 parts of the UNIDIC ZL-295, and 0.22 parts of the propylene glycol monomethyl ether acetate were added and blended in the paint conditioner. Thus, an evaluation-use composition 4 for forming a green pixel portion of a color filter was obtained. This evaluation-use composition 4 was spin coated on soda glass while varying film thickness, and dried at 90° C. for three minutes. Thus, an evaluation-use glass substrate was obtained. This glass substrate was heated at 230° C. for one hour and, thereafter, chromaticity (x, y) in the C illuminant were measured and the film thickness was measured.

Film thickness: 1.5 µm, Color x: 0.176, Color y: 0.391
Film thickness: 1.9 µm, Color x: 0.164, Color y: 0.407
Film thickness: 2.4 µm, Color x: 0.148, Color y: 0.428

[Preparation of Toning Composition 1]

1.65 parts of Pigment Yellow 129 (IRGAZIN Yellow L0800 manufactured by Ciba Specialty Chemicals Corporation), 3.85 parts of DISPERBYK-161 (manufactured by BYK Chemie), and 11.00 parts of propylene glycol monomethyl ether acetate were dispersed for two hours in the paint conditioner along with and using 0.3 to 0.4 mm zircon beads. Thus, a coloring composition 5 was obtained. 4.0 parts of the coloring composition 5, 0.98 parts of the UNIDIC ZL-295, and 0.22 parts of the propylene glycol monomethyl ether acetate were added and blended in the paint conditioner. Thus, a toning composition 1 was obtained.

[Preparation of Toning Composition 2]

Other than using Pigment Yellow 139 (Paliotol Yellow D1819 manufactured by BASF SE), dispersion treatment was carried out similarly to the preparation of toning composition 1. Thus, a toning composition 2 was obtained.

[Preparation of Toning Composition 3]

Other than using Pigment Yellow 150 (E4GNGT manufactured by LANXESS), dispersion treatment was carried out similarly to the preparation of toning composition 1. Thus, a toning composition 3 was obtained.

[Preparation of Toning Composition 4]

Other than using Pigment Yellow 185 (Paliotol Yellow D1155 manufactured by BASF SE), dispersion treatment was carried out similarly to the preparation of toning composition 1. Thus, a toning composition 4 was obtained.

Examples 5 to 20

The glass substrates obtained by mixing, film forming, and drying the evaluation-use compositions 1 to 4 obtained through Examples 1 to 4 and the toning compositions 1 to 4 were heated at 230° C. for one hour. Then, a coating film displaying chromaticity (x, y)=(0.240, 0.650) in the C illuminant was formed. The brightness was measured using a CM-3500d (manufactured by Konica Minolta, Inc.) and the film thickness was measured using an OPTELICS C130 real color confocal microscope (manufactured by Lasertec Corporation).

Comparative Example 1

2.48 parts of Pigment Green 7 (FASTOGEN Green S manufactured by DIC Corporation), 1.24 parts of BYK-LPN6919, 1.86 parts of UNIDIC ZL-295, and 10.92 parts of propylene glycol monomethyl ether acetate were dispersed for two hours in the paint conditioner along with and using 0.3 to 0.4 mm zircon beads. Thus, a coloring composition 6 was obtained. 4.0 parts of the coloring composition 6, 0.98 parts of the UNIDIC ZL-295, and 0.22 parts of the propylene glycol monomethyl ether acetate were added and blended in the paint conditioner. Thus, an evaluation-use composition 5 for forming a green pixel portion of a color filter was obtained.

Comparative Example 2

2.48 parts of Pigment Green 58 (FASTOGEN Green A110 manufactured by DIC Corporation), 1.24 parts of BYK-LPN6919, 1.86 parts of UNIDIC ZL-295, and 10.92 parts of propylene glycol monomethyl ether acetate were dispersed for two hours in the paint conditioner along with and using 0.3 to 0.4 mm zircon beads. Thus, a coloring composition 7 was obtained. 4.0 parts of the coloring composition 7, 0.98 parts of the UNIDIC ZL-295, and 0.22 parts of the propylene glycol monomethyl ether acetate were added and blended in the paint conditioner. Thus, an evaluation-use composition 6 for forming a green pixel portion of a color filter was obtained. This evaluation-use composition 6 was spin coated on soda glass while varying film thickness, and dried at 90° C. for three minutes. Thus, an evaluation-use glass substrate was obtained. This glass substrate was heated at 230° C. for one hour and, thereafter, chromaticity (x, y) in the C illuminant were measured and the film thickness was measured.

Film thickness: 1.5 µm, Color x: 0.245, Color y: 0.509
Film thickness: 1.9 µm, Color x: 0.238, Color y: 0.545
Film thickness: 2.4 µm, Color x: 0.230, Color y: 0.589

Comparative Example 3

91 parts of sulfuryl chloride, 109 parts of aluminum chloride, 15 parts of sodium chloride, 30 parts of zinc phthalocyanine, and 30 parts of bromine were charged into a 300 mL flask. The temperature was raised to 130° C. over the course of 40 hours and the resulting mixture was taken out from the flask and put in water. Then, the mixture was filtered. Thus, a green crude pigment was obtained. 20 parts of the obtained green crude pigment, 140 parts of powdered sodium chloride, 32 parts of diethylene glycol, and 1.8 parts of xylene were charged into the 1 L double-arm kneader and kneaded for six hours at 100° C. The resulting product was placed in 2 kg of 80° C. water after the kneading and the mixture was stirred for one hour. Thereafter, the mixture was filtered, washed with hot water, dried, and crushed. Thus, a green pigment was obtained. The obtained green pigment was subjected to X-ray fluorescence analysis. From this analysis, it was found that the obtained green pigment was a halogenated zinc phthalocyanine having an average of 10.01 halogen atoms per molecule, an average of 6.92 being bromine atoms and an average of 3.09 being chlorine atoms.

2.48 parts of the obtained green pigment, 1.24 parts of BYK-LPN6919, 1.86 parts of UNIDIC ZL-295, and 10.92 parts of propylene glycol monomethyl ether acetate were dispersed for two hours in the paint conditioner along with and using 0.3 to 0.4 mm zircon beads. Thus, a coloring composition 8 was obtained. 4.0 parts of the coloring composition 8, 0.98 parts of the UNIDIC ZL-295, and 0.22 parts of the propylene glycol monomethyl ether acetate were added and blended in the paint conditioner. Thus, an evaluation-use composition 7 for forming a green pixel portion of a color filter was obtained. This evaluation-use composition 7 was spin coated on soda glass while varying film thickness, and dried at 90° C. for three minutes. Thus, an evaluation-use glass substrate was obtained. This glass substrate was heated at 230° C. for one hour and, thereafter, chromaticity (x, y) in the C illuminant were measured and the film thickness was measured.

Film thickness: 1.5 µm, Color x: 0.127, Color y: 0.343
Film thickness: 1.9 µm, Color x: 0.123, Color y: 0.346
Film thickness: 2.4 µm, Color x: 0.118, Color y: 0.350

Comparative Examples 4 to 15

The glass substrates obtained by mixing, film forming, and drying the evaluation-use compositions 5 to 7 obtained through Comparative Examples 1 to 3 and the toning compositions 1 to 4 were heated at 230° C. for one hour. Then, a coating film displaying chromaticity (x, y)=(0.240, 0.650) in the C illuminant was formed. The brightness was measured using a CM-3500d (manufactured by Konica Minolta, Inc.) and the film thickness was measured using an OPTELICS C130 real color confocal microscope (manufactured by Lasertec Corporation).

These Examples and Comparative Examples were shown in Table 1 and the chromaticity region where the pigment composition of the present invention is monochromatically displayable is illustrated in FIG. 1.

[Evaluation Standards]

Cases where, independent of the toning composition used to tone, the film thickness was less than in evaluation-use composition 5 and brightness was higher than in evaluation-use composition 5 were marked with a "○". Only in cases where a specific toning composition was used to tone, the film thickness was less than in evaluation-use composition 5 and brightness was higher than in evaluation-use composition 5 were marked with a "Δ". Cases where, regardless of which of the toning compositions was used to tone, the film thickness was less than in evaluation-use composition 5 and brightness was higher than in evaluation-use composition 5 were marked with an "x".

Thus, it is clear that the coating films of Examples 5 to 20 have more desirable characteristics as green pigments for color filters. The coating films of Examples 5 to 20, which were made using the pigment composition of the present invention are tonable independent of the type of toning composition used and have higher brightness compared to the coating films of Comparative Examples 6, 9, 12, and 15 which used the evaluation-use composition 7. Thus, it is clear that the coating films of Examples 5 to 20 have more desirable characteristics as green pigments for color filters.

The invention claimed is:

1. A pigment composition for a color filter, the pigment composition comprising a halogenated zinc phthalocyanine pigment containing an average of 10 to 14 halogen atoms per molecule, an average of 8 to 12 being bromine atoms and an average of 2 to 5 being chlorine atoms,
   wherein when a film thickness of a coating film including the halogenated zinc phthalocyanine pigment and a resin is from 1.5 μm to 2.4 μm, an xy chromaticity coordinate region in CIE XYZ color space, colormetered alone using a C illuminant, bounded by formulae (5) to (8) below can be displayed:

$$y=-1.766x+0.628 \quad \text{Formula (5)}$$

(where x is such that $0.13<x<0.17$)

TABLE 1

| | Toning composition 1 | Toning composition 2 | Toning composition 3 | Toning composition 4 | Evaluation |
|---|---|---|---|---|---|
| Evaluation-use composition 1 | Example 5<br>Brightness: 36.95<br>Film Thickness: 2.46 | Example 9<br>Brightness: 29.54<br>Film Thickness: 2.97 | Example 13<br>Brightness: 37.13<br>Film Thickness: 3.48 | Example 17<br>Brightness: 24.49<br>Film Thickness: 2.94 | ○ |
| Evaluation-use composition 2 | Example 6<br>Brightness: 37.10<br>Film Thickness: 2.26 | Example 10<br>Brightness: 28.29<br>Film Thickness: 2.81 | Example 14<br>Brightness: 37.39<br>Film Thickness: 3.44 | Example 18<br>Brightness: 21.81<br>Film Thickness: 2.83 | ○ |
| Evaluation-use composition 3 | Example 7<br>Brightness: 36.86<br>Film Thickness: 2.13 | Example 11<br>Brightness: 27.06<br>Film Thickness: 2.68 | Example 15<br>Brightness: 37.29<br>Film Thickness: 3.43 | Example 19<br>Brightness: 18.87<br>Film Thickness: 2.83 | ○ |
| Evaluation-use composition 4 | Example 8<br>Brightness: 36.55<br>Film Thickness: 2.33 | Example 12<br>Brightness: 27.98<br>Film Thickness: 2.86 | Example 16<br>Brightness: 37.09<br>Film Thickness: 3.50 | Example 20<br>Brightness: 21.71<br>Film Thickness: 2.87 | ○ |
| Evaluation-use composition 5 | Comparative Example 4<br>Brightness: 34.42<br>Film Thickness: 2.46 | Comparative Example 7<br>Brightness: 24.59<br>Film Thickness: 3.12 | Comparative Example 10<br>Brightness: 34.64<br>Film Thickness: 3.81 | Comparative Example 13<br>Brightness: 17.87<br>Film Thickness: 3.20 | Standard |
| Evaluation-use composition 6 | Comparative Example 5<br>Brightness: 39.35<br>Film Thickness: 3.18 | Comparative Example 8<br>Brightness: 36.81<br>Film Thickness: 3.52 | Comparative Example 11<br>Brightness: 39.83<br>Film Thickness: 3.74 | Comparative Example 14<br>Brightness: 35.21<br>Film Thickness: 3.43 | Δ |
| Evaluation-use composition 7 | Comparative Example 6<br>Untonable | Comparative Example 9<br>Brightness: 22.00<br>Film Thickness: 2.57 | Comparative Example 12<br>Untonable | Comparative Example 15<br>Brightness: 13.89<br>Film Thickness: 2.77 | X |

It is clear from Table 1 that the coating films of Examples 5 to 20, which were made using the pigment composition of the present invention have reduced film thickness and higher brightness compared to the coating films of Comparative Examples 4, 7, 10, and 13, which used the evaluation-use composition 5 made from Pigment Green 7. Thus, it is clear that the coating films of Examples 5 to 20 have more desirable characteristics as green pigments for color filters. The coating films of Examples 5 to 20, which were made using the pigment composition of the present invention have reduced film thickness compared to the coating films of Comparative Examples 5, 8, 11, and 14, which used the evaluation-use composition 6 made from Pigment Green 58.

$$y=4.598x-0.199 \quad \text{Formula (6)}$$

(where x is such that $0.13<x<0.17$)

$$y=-3.498x+1.177 \quad \text{Formula (7)}$$

(where x is such that $0.17<x<0.21$)

$$y=2.865x-0.159 \quad \text{Formula (8)}$$

(where x is such that $0.17<x<0.21$).

2. A color filter comprising the pigment composition for a color filter described in claim 1.

* * * * *